United States Patent [19]

Courten et al.

[11] 3,836,258
[45] Sept. 17, 1974

[54] ANGULAR ORIENTATION MEASURING APPARATUS

[75] Inventors: Henry C. Courten, Commack; Joseph P. Mattal, Smithtown, both of N.Y.

[73] Assignee: Grumman Aerospace Corporation, Bethpage, Long Island, N.Y.

[22] Filed: Dec. 15, 1972

[21] Appl. No.: 315,486

[52] U.S. Cl.................. 356/138, 356/150, 356/172
[51] Int. Cl. ........................................... G01b 11/26
[58] Field of Search ....... 356/16, 17, 138, 137, 140, 356/144, 172, 148, 150, 253, 254, 19, 150, 153, 154; 33/329

[56] References Cited
UNITED STATES PATENTS

| | | | |
|---|---|---|---|
| 1,339,235 | 5/1920 | Taylor | 356/16 |
| 1,907,873 | 5/1933 | Richards et al. | 356/150 |
| 2,524,745 | 10/1950 | Adkins | 33/329 |
| 2,667,805 | 2/1954 | Carr | 356/155 |
| 2,685,814 | 8/1954 | Sloan | 356/17 |
| 2,910,775 | 11/1959 | Muller et al. | 356/155 |
| 3,171,208 | 3/1965 | Bender | 356/150 |
| 3,419,329 | 12/1968 | Vogeley et al. | 356/150 |
| 3,481,039 | 12/1969 | Kantz | 356/150 |

Primary Examiner—Ronald L. Wibert
Assistant Examiner—Paul K. Goodwin
Attorney, Agent, or Firm—Mellor A. Gill

[57] ABSTRACT

An optical device using a wedge deviation technique for the measurement of the angular orientation about the axis of rotation of one body relative to another. The device employs a passive target, which may be a linear reticle, on one body and optical measuring means on the second body. The measuring means has an optical element such as a prism assembly to split the image of spaced apart portions of the linear target into two transposed halves which are viewed by suitable means such as a telescope. An optical wedge assembly centered in the line of sight on the axis of rotation between the telescope and the target can be used as the optical element. When the target reticle lies in the plane described by the optically deviated split field of view of the telescope, an unbroken line is perceived through the telescope. When rotation about the line of sight occurs in one body with respect to the other, a linear displacement of one half of the split image of the target with respect to the other occurs. The amount of rotation of the optical measuring means required to bring the split image back into coincidence is correlated against a calibrated scale to give an indication of the amount of angular displacement about the axis of rotation that had occured. In a further embodiment, an arrangement of mirrors rather than a wedge assembly is used to produce the split image in the optical measuring means.

7 Claims, 4 Drawing Figures

LEFT AND RIGHT FIELD OF VIEW COMBINED

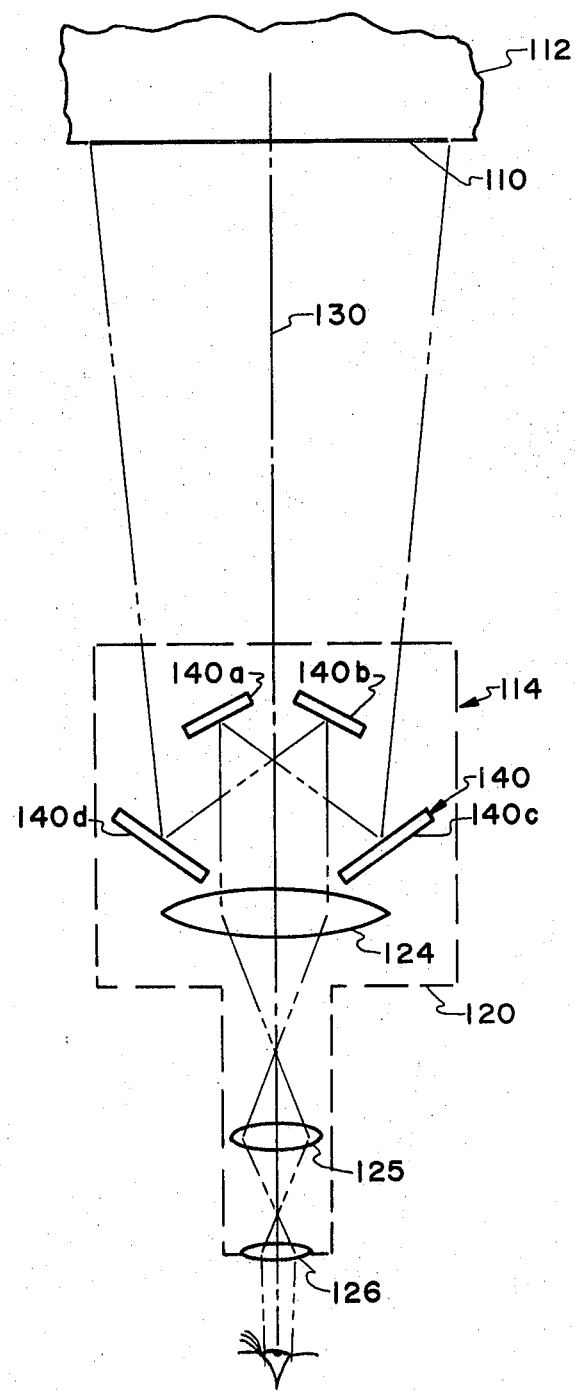

ANGULAR ORIENTATION MEASURING APPARATUS

BACKGROUND OF THE INVENTION

1. Field of the Invention

This invention relates to an improvement in optical instruments for measuring angular displacement and, in particular, to an optical instrument using a wedge deviation technique for the measurement of roll about the axis of rotation.

2. Description of the Prior Art

It is known in the prior art to employ various techniques for measuring angular displacement or roll about the axis of rotation. A technique that is coming into increasing use is one in which polarized light is employed with a Wollaston prism and detector arrangement. In this known arrangement, a beam of plane polarized light from one body is projected along the axis of rotation to a second body and is passed through a Wollaston prism to thereby produce two output beams. The two output beams are monitored in a well known manner by intensity-sensitive photodetectors such that indications of displacement of one body relative to the other about the roll axis are obtained. It is seen, however, that the use of polarized light entails a requirement for polarizers and associated equipment and the photodetectors introduce the need for electrical means to process the output signals. Further, a characteristic of almost all these prior art techniques is that they use precisely ground optical elements such as lenses and prisms which have severe requirements with respect to the alignment of the optical components and to their protection from misuse and damage.

It is also known in the prior art to use a wedge deviation technique in various optical measuring instruments. The well known coincidence range finder is an example of such technique. A further exemplary showing in the prior art of the use of a wedge deviation technique to produce a split image in an optical measuring instrument is the optical extensometer disclosed by J. Murray in U.S. Pat. No. 3,549,257. To our knowledge, however, these prior art uses of a wedge deviation technique are utilized in instruments such as the referenced range finder and extensometer which are used to measure linear distances such as range or the elongation of a test specimen rather than the angular displacement measurement of the subject device.

SUMMARY OF THE INVENTION

The subject invention uses a wedge deviation technique to measure roll about the axis of rotation of one body relative to another. In this invention, a passive target such as a line reticle on one body is monitored by optical means on the second body to measure relative angular orientation. The optical measuring means comprises an optical element such as a wedge assembly that splits the image of the target into halves which will be in coincidence when the target reticle lies in the plane described by the optical deviation. The image is conveniently viewed through a telescope and a calibrated scale can be incorporated in the optical means to measure the rotational orientation of the bodies. In this system, when there is a rotation about the line of sight of one body relative to the other, the image halves will move out of coincidence with respect to one another. The amount of rotation of the optical means required to bring the image halves back into coincidence is read off the calibrated scale to measure the relative rotation that has occurred between the two bodies.

It is thus a principal object of this invention to provide improved apparatus for measuring angular orientation about the axis of rotation of one body relative to another in which a simple, passive target can be employed on one body and an inexpensive wedge assembly and suitable viewing means can be used on the other body to measure relative roll therebetween.

It is a further object of this invention to provide improved angular orientation measuring apparatus which is sensitive principally to rotational displacements and which is relatively insensitive to translational offsets and angular mismatches in elevation and azimuth between the instrument and the target.

It is another object of this invention to provide an optical means for measuring angular displacement which does not have a requirement for light polarization equipment or for associated electronic or electrical monitoring apparatus.

It is a further object of this invention to provide optical angular orientation monitoring apparatus in which either optical refracting means such as a wedge assembly or optical reflecting means such as a simple inexpensive arrangement of mirrors can be used equally successfully.

Yet another object of this invention is to provide a new and improved optical angular displacement measuring instrument which is relatively inexpensive and of a rugged, uncomplicated construction which is lightweight and compact for easy handling even in field use. Further, it is an object to provide an instrument of this type in which any required illumination for target reticle enhancement can be provided by an inexpensive battery-operated light source.

DESCRIPTION OF THE DRAWINGS

For the purpose of illustrating the invention, there is shown in the drawings the forms which are presently preferred, it being understood, however, that this invention is not necessarily limited to the precise arrangements and instrumentalities here shown.

FIG. 4 is a schematic diagrammatic representation of another embodiment of the inventive angular orientation measuring instrument.

DESCRIPTION OF THE PREFERRED EMBODIMENTS

Figures 1, 2, 3:
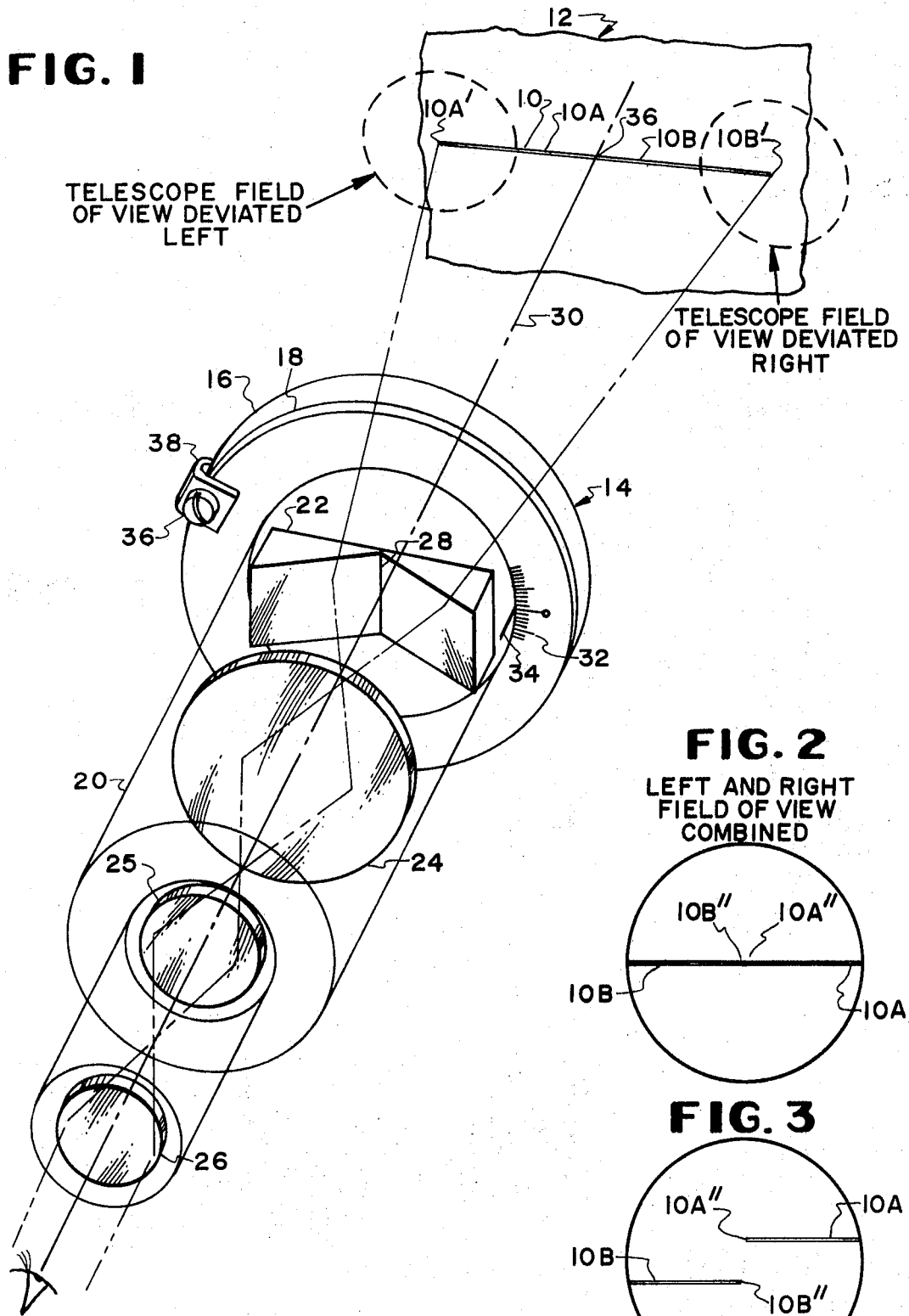
FIG. 1 is a schematic, diagrammatic representation of the inventive angular-orientation measuring instrument illustrating its use with a linear target.
FIG. 2 illustrates the linear target as seen through the viewing telescope of the FIG. 1 device.
FIG. 3 illustrates the linear target as seen through the viewing telescope of the FIG. 1 device when relative rotation has occurred between the device and the target.

Referring now to FIG. 1 of the drawings, the angular orientation monitoring apparatus comprises a target such as a line reticle 10 on one body 12 and a measuring instrument 14 mounted on a second body (not shown) on the axis of rotation therebetween. It will be appreciated that the first body can be, for example, a machine or component thereof being aligned and the second body upon which instrument 14 is mounted can be a tripod or fixture standing on the floor of the building in which the first body is contained. Reticle 10 can be a line scribed or painted on the first body or it can be an edge of the first body or other feature which has suitable characteristics to enable it to be used as a target. If the level of ambient light requires an illuminated target, a bright line reticle can be fabricated by slotting a side of a sheet metal box mounted on the target body in which a suitable electric lamp is contained such that the lighted slot can be used as a line reticle.

Measuring instrument 14 has a suitable housing 16 having a stationary element 18 fixed by suitable means (not shown) to the second body. An optical unit 20 (indicated in outline in FIG. 1) containing the optical elements of the instrument is mounted in element 18 and is suitably adapted for rotation therewith. The optics of unit 20 comprise an optical wedge assembly 22 and a telescope having an objective lens 24, an erector lens 25, and an eyepiece or eye lens 26 for viewing the image refracted by the wedge assembly. Wedge assembly 22 splits the field of view inducing a deviation (suitably about 4 degrees) centered on the axis of rotation 30 of the instrument with respect to the target line reticle. As mentioned previously, optical unit 20 can be rotated with respect to fixed element 18 of the housing 16. Rotation of unit 20 will rotate the optics contained therein about the line of sight which is also the axis of rotation 30 between the instrument 14 and the target reticle 10. Fixed element 18 can be provided with a suitable scale 32 and the optical unit 20 with an index mark 34 such that the precise amount of rotational adjustment therebetween can be determined readily. Scale 32 is adjustable with respect to unit 20 to enable the zero point or other indicia of the scale to be aligned or nulled with the index mark 34 when the instrument is initially being set up. Any suitable means such as a locking screw 36 and clamp 38 can be provided to lock the scale in place after the initial set up has been made. It will be understood, of course, that FIG. 1 is merely a diagrammatic representation of the apparatus of the invention: thus, conventional supporting parts, lens-mounting means, and the like, have been omitted.

In the operation of the FIG. 1 embodiment of the invention, the target 10 is positioned such that the axis of rotation 30 passes approximately through the midpoint of the line reticle and the instrument 14 is aligned with its axis coinciding with the axis of rotation. If, when the instrument is set up, the target reticle lies in the plane described by the optically deviated split field of view of the telescope, the image presented at the eyepiece 26 will be as shown in FIG. 2 with the halves 10A and 10B of the split image of the line reticle in coincidence with one another. Locking screw 36 can be loosened and the scale adjusted, if required, to null the instrument and the scale then re-locked. Should the halves of the split image not be in coincidence when the set up is made, optical unit 20 should be rotated to achieve coincidence and the scale set to the null point and locked in that position.

When angular displacement occurs about the axis of rotation between the instrument and body 12 carrying the line reticle 10, the halves 10A and 10B of the split image will be displaced relative to one another such that the image presented at the eyepiece will be as shown in FIG. 3. It will be appreciated that because of the optical characteristics of the device, there is a relative transposition of the halves of the line reticle such that points 10A' and 10B' in FIG. 1 are viewed as points 10A'' and 10B'' of FIGS. 2 and 3. To determine the amount of angular displacement that has occurred, optical unit 20 is rotated with respect to housing 18 to bring the halves 10A and 10B of the image of the reticle back into coincidence. The amount of rotation of the optical unit 20 required to restore coincidence will be indicated by the position of the index mark 34 with respect to the scale 32 which is calibrated appropriately such that the angular displacement can be thereby measured. In one exemplary embodiment of the invention in which the body whose roll was being monitored was positioned at 170 inches from the measuring instrument 14, the target line reticle had a line width of 0.0125 inch and was approximately eleven inches long. In the optics of the instrument, the telescope had a 16x magnification and the optical wedge assembly had a total deviation of 3° 42' centered about the telescope line of sight. With that embodiment, the rotational adjustment of optical unit 20 to bring the split image of the reticle into single-line coincidence permits the achievement of zero roll angle to better than ± 0.5 arc minute.

It will be appreciated that the production of a split image of a target to measure angular deflection can be accomplished by optical means other than a wedge assembly. Thus, for example, an arrangement of mirrors, as illustrated in FIG. 4, can be utilized to achieve the objects of the invention. In such arrangement, the measuring instrument 114 has an optical unit 120 (indicated in broken-line outline) containing the optical elements of the instrument. As in the FIG. 1 embodiment of our invention, instrument 114 has a stationary element (not shown) in which unit 120 is mounted for rotative adjustment and has also means (not shown) for determining the precise amount of relative rotation therebetween. Instrument 114 will also have any required conventional supporting parts, lens and mirror mounting means and the like, but these are also not shown or will not be further described in the interests of brevity and clarity. The optics of unit 120 comprise a four-mirror arrangement 140 for producing a split image of a target line reticle 110 carried on body 112 and a telescope having an objective lens 124, an erector lens 125, and an eyepiece or eye lens 126 for viewing the image reflected by mirrors 140. Mirror pair 140a and 140b, and mirror pair 140c and 140d of arrangement 140 are positioned such that the junctions of the planes of the reflecting faces of the pairs are centered with respect to objective lens 124 and on the line of sight which coincides with the axis of rotation 130. It will be seen that the mirror arrangement 140 is the full optical equivalent of the wedge assembly 22 of the FIG. 1 embodiment; thus, the operation of the embodiment of FIG. 4 including the setting up of the instrument, the bringing of the split image of the line reticle back into single line coincidence during the measuring operation, and the correlation of the amount of rotation required to achieve coincidence against a calibrated scale may be understood from the description given of the operation of the FIG. 1 embodiment and it is not believed that a repetition of that exposition is needed or would serve a useful purpose.

Although shown and described in what is believed to be the most practical and preferred embodiments, it is apparent that departures from the specific constructions and apparatus described will suggest themselves to those skilled in the art and may be made without departing from the spirit and scope of the invention. We, therefore, do not wish to restrict ourselves to the particular constructions illustrated and described, but desire to avail ourselves of all modifications that may fall within the scope of the appended claims.

Having thus described our invention, what we claim is:

1. An optical instrument for measuring the angular orientation about the axis of rotation of a first body relative to a second body, said axis being on the line of sight, comprising:

a target reticle on said first body, said reticle having a linear portion;

optical means on said second body for producing a split image in transposition of spaced-apart portions of said target reticle by an optical deviation of the axis technique, the junction of the planes of the light deviating faces of said optical means being centered on said axis of rotation such that said split image comprises two transposed halves which will be in coincidence when said target reticle lies in the plane described by the optically deviated split axis of said optical means, said two image halves being out of coincidence and displaced one from the other when said target reticle is no longer in said described plane because of relative rotation between said first and said second bodies;

means for rotationally adjusting said optical means about said axis of rotation; and measuring means for determining the amount of said adjustment of said optical means required to bring said image halves back into coincidence when relative rotation between said bodies has caused said image halves to have moved out of coincidence with one another whereby relative rotation between said two bodies can be quantified.

2. The optical instrument of claim 1 wherein the optical means on said second body produces the split image of the target reticle by optical refraction means.

3. The optical instrument of claim 1 wherein the optical means on said second body produces the split image of the target reticle by optical reflection means.

4. The optical instrument of claim 2 wherein the optical refraction means is a prism assembly.

5. The optical instrument of claim 4 wherein the optical refraction means is an optical deviation wedge assembly.

6. The optical instrument of claim 3 wherein the optical reflection means are mirrors.

7. The optical instrument of claim 1 wherein means are provided for viewing the optical output from the optical means producing the split image.

* * * * *